United States Patent [19]

Smith

[11] Patent Number: 5,146,498
[45] Date of Patent: Sep. 8, 1992

[54] REMOTE KEY MANIPULATIONS FOR OVER-THE-AIR RE-KEYING

[75] Inventor: Jeffrey D. Smith, Lauderhill, Fla.

[73] Assignee: Motorola, Inc., Schaumburg, Ill.

[21] Appl. No.: 639,476

[22] Filed: Jan. 10, 1991

[51] Int. Cl.$^5$ .............................. H04L 9/02
[52] U.S. Cl. ...................... 380/21; 380/49; 380/44
[58] Field of Search ............ 380/21, 28, 29, 30, 380/43, 44, 47, 48, 49, 50

[56] References Cited

U.S. PATENT DOCUMENTS

| | | |
|---|---|---|
| 4,440,976 | 4/1984 | Bocci et al. |
| 4,607,137 | 8/1986 | Jansen et al. ............... 380/50 X |
| 4,731,840 | 3/1988 | Mniszewski et al. |
| 4,878,246 | 10/1989 | Pastor et al. ............... 380/50 X |
| 4,882,751 | 11/1989 | Kotzin et al. |
| 4,914,697 | 4/1990 | Dabbish et al. |
| 4,933,971 | 6/1990 | Bestock et al. |
| 4,993,067 | 2/1991 | Leopold ...................... 380/21 |
| 5,008,938 | 4/1991 | Freeburg et al. ............ 380/50 |

*Primary Examiner*—Tod Swann
*Attorney, Agent, or Firm*—Juliana Agon

[57] ABSTRACT

A method of remotely changing an original voice encryption key in a secure radio (10) is provided which includes a central controller (20) transmitting to the secure radio a digital word (42) representing a selective operation to be performed on the original voice encryption key stored in the radio (10). In response to the digital word (42), the radio (10) performs the operation on the original voice encryption key to generate a current voice encryption key.

20 Claims, 3 Drawing Sheets

REMOTE KEY MANIPULATIONS FOR OVER-THE-AIR RE-KEYING

TECHNICAL FIELD

This invention relates generally to digitally encrypted voice signals and more particularly to a method for providing a secure trunked communications system by changing a key used to encrypt and decrypt the voice signal.

BACKGROUND

Secure communications systems are known in the art. Such systems typically render a voice message unintelligible to prevent unauthorized reception. To accomplish this the voice message can be digitized and processed through an encryption device to produce a resulting signal that appears to be random (or pseudo-random) in nature. Such a signal appears like noise to unauthorized receivers and discourages intelligible reception. The particular encryption algorithm used by the encryption device maybe a proprietary algorithm or may be based on a standard such as the Data Encryption Standard (DES) promulgated by the United States National Bureau of Standards. In a typical encryption device a secret key is utilized in conjunction with a cipher algorithm to encrypt and decrypt messages. The keys may be changed or rekeyed as frequently as desired in order to enhance security.

It is sometimes however desirable in such voice protection or secure systems to maintain different levels of security. A supervisor for example may wish to deliver a scrambled message to one user or a set of users without communicating with another set of users on the same channel. One method of accomplishing this is to call a remote unit in the clear (without encryption) and identify a particular key that is to be used to unscramble an ensuing message. Key identification is used to identify which one of a multiplicity of keys was used to encrypt the message and also to keep the access time down to a minimum. This however requires vast memory storage of the keys in the subscriber unit especially if the keys are to be unique and are to be changed frequently.

Such secure communication is a feature mainly available on conventional communications systems that make use of dedicated channels. This has occurred in part because the encrypted signal itself comprises a 12 kilo bits per second (KBS) data string that requires substantially all of the available spectrum of the assigned channel. Currently conventional communications systems use a secure communication method which is performed by sending encrypted information about the key to be used via signalling data. This key information includes the transmission of the actual key having multiple (64) bits for DES.

Conventional channel allocation systems however do not represent optimum usage of the increasingly crowded communications spectrum. Trunked systems are well recognized to make more efficient usage of available channel allocations. Such systems typically include at least one central controller or fixed end that controls channel allocation between various subscriber units (as used herein subscriber units includes all remote transceiving devices such as mobile units installed in vehicles, other controlled stations, portable devices, and radio frequency (RF) linked telephones).

However, far too much information is sent using the conventional remote key information method for it to be possible to use the control channel of a trunked system. Especially when a fleet of subscriber units or radios have to be rekeyed, a lot of air time would be consumed on the control channel in a trunked system, rendering it effectively immobilized for quite some time. Such a signal thus presents compatibility problems when compared to the trunked channel maintenance protocol which includes control signals such as connect tones, handshake signals, acknowledge tones, and disconnect tones.

Accordingly there exists a strongly felt need for a combined secure trunked communication system that is remotely rekeyable without taking up too much system access time or subscriber memory space.

SUMMARY OF THE INVENTION

Accordingly, it is an advantage of the present invention to provide an efficient method for securing a trunked communications system by remotely varying the key to decrypt a voice signal.

Briefly, according to the invention, a method of remotely changing an original voice encryption key in a secure radio comprises transmission by a central controller to the secure radio of a digital word representing a selective operation to be performed on the original voice encryption key stored in the radio. In response to the digital word, the radio performs the operation on the original voice encryption key to generate a current voice encryption key.

DETAILED DESCRIPTION OF THE PREFERRED EMBODIMENT

Figure 1:
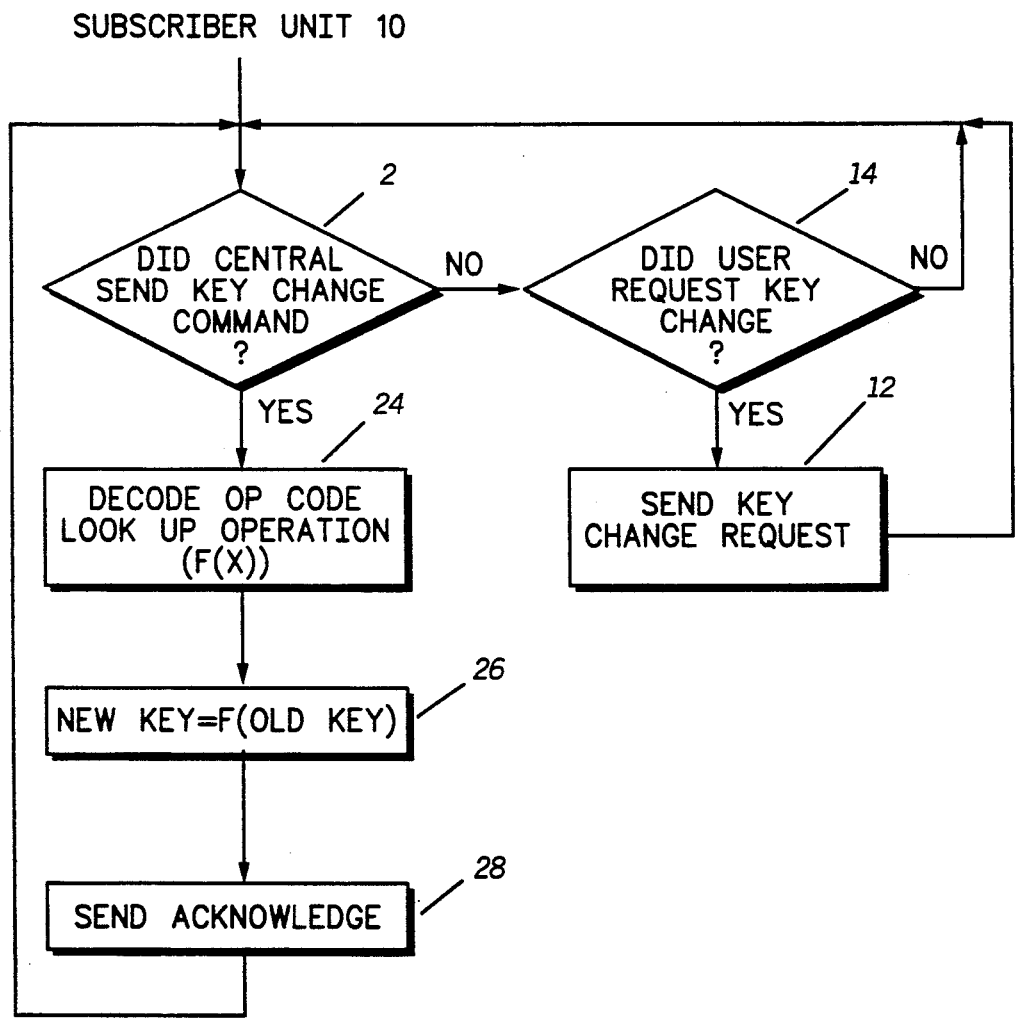
FIG. 1 is a flowchart depicting a method for changing a key by a subscriber unit in accordance with the present invention.
Figure 2:
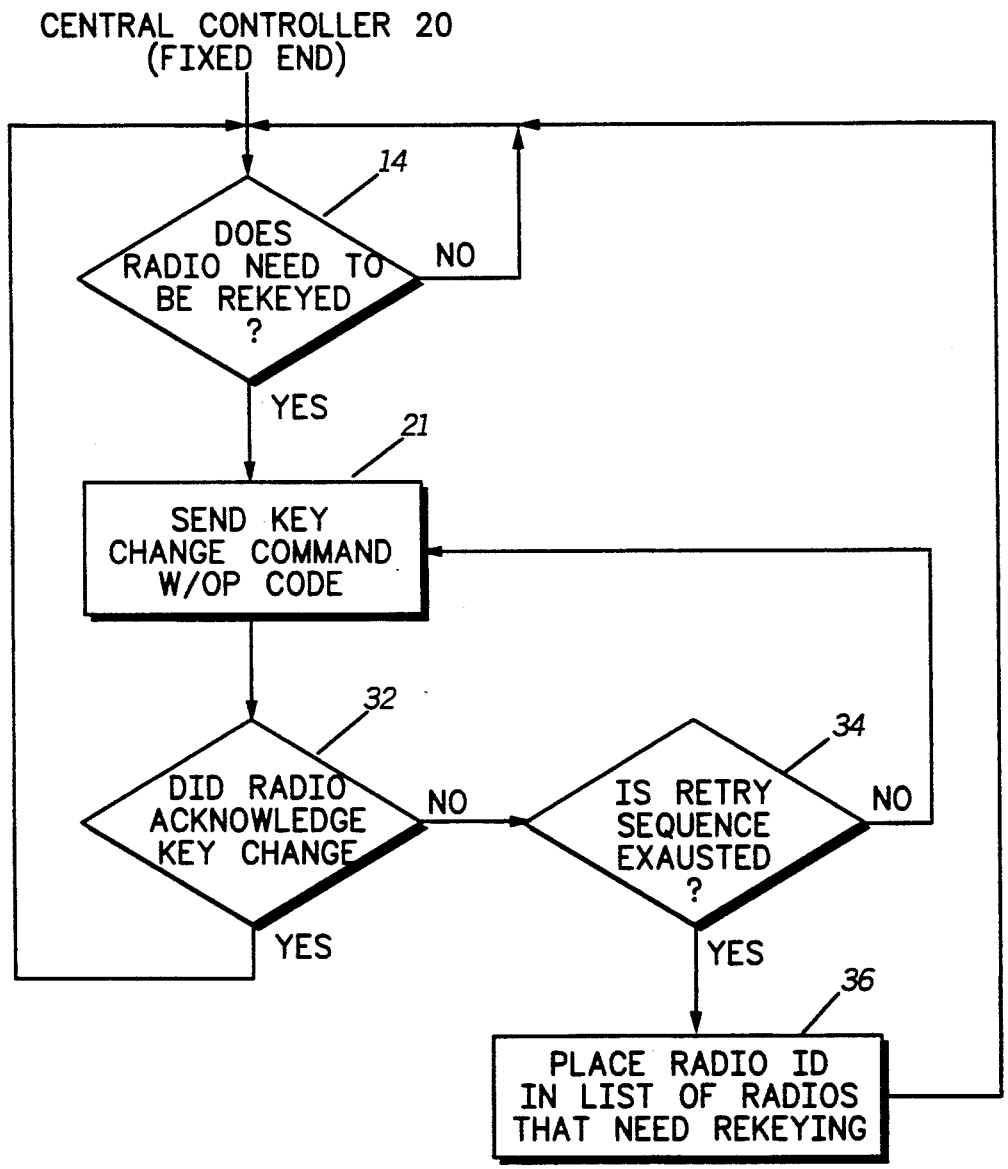
FIG. 2 a flowchart depicting a method for generating a key change command by a central controller in accordance with the present invention.

Referring to FIGS. 1 and 2, a flowchart depicting the steps taken in a central controller 20 and in each one of a plurality of remote subscriber units or radios 10 communicating over the air via a trunking channel or any other secure radio frequency channel with the central controller 20. As in the prior art, the subscriber unit 10 has already been loaded, hard wired or programmed over-the-air by the central controller 20 with an initial binary key, $K_\phi$. In this invention, the major difference is that the sequence of bits loaded into the radio originally will not necessarily be the actual key used to encrypt and decrypt voice or data information. The working, current, or new key would be the result of some operation on the initial key sequence. This operation could be as simple as a rotation of the sequence through some specified number of positions. The exact number would be sent by the controller in a "key-switch outbound signal word (OSW)" òr key change command, which is a control signal sent by the controller in a trunking system.

The subscriber unit 10 in a decision block 2 determines whether the central controller 20 has transmitted a key change command for rekeying. If not, the subscriber unit 10 determines in another decision block 4 whether the user or operator of the subscriber unit wishes to request a key change to obtain better security. If rekeying is not desired at this time, the subscriber unit 10 returns to the initial decision block 2 awaiting further action.

If yes, the subscriber unit 10 transmits a key change request. The key request includes data identifying the subscriber unit to the central controller 20. On receipt of the key change request from the subscriber unit 10, the central controller 20 answers "yes" in a decision block 14 to the question as to whether the subscriber units or radios need to be rekeyed. If it is determined by the central controller 20 that a new key need not be generated, the central controller taking the no branch of the decision block 14 returns to the initial accessing point of the same block to await the next key change request from the subscriber unit 10.

Assuming rekeying was desired, in step 21, a key change command with an operational code (OP code) along with data (including X) is transmitted to the subscriber unit 10 by the central controller 20. The subscriber unit 10 will now return to the decision block 2 to determine whether the central controller 20 has transmitted the key change command. If it has, in step 24, the subscriber unit 10 will decode the OP code and look up the operation in its memory, which may be a mere rotation or a more involved function, F(X), required to change the original key, $K_\phi$, in accordance with a method to be described later. The new encryption key is then formed at step 26 by the subscriber unit 10 performing the operation specified by the OP code on the old or original key $K_\phi$.

After rekeying in step 26, the subscriber unit 10 will use the new encryption key for encryption of data/voice or decryption of data/voice according to an encryption algorithm such as the National Bureau of Standards encryption/decryption algorithm (DES) which is the Federal Information processing standard approved by the U.S. Department of Commerce. This standard National Bureau of Standards algorithm may later be used to decrypt the encrypted data or voice to retrieve the voice or data in its original form. Using the function specified by the OP code that was transmitted by the central controller 20, the subscriber unit 10 is thus able to form a new or current encryption or decryption key. An acknowledgement that the new or current key has been formed according to the method proscribed is then sent in step 28 to the central controller 20 by the subscriber unit 10. Finally, the subscriber unit 10 will return to the original decision block 2 to start the sequence anew if a new key is requested or more iteration of functions is desired on the original key to form a new key from the current key. This new key is then stored for use in encryption and decryption of subsequent voice communications with the central controller 20 or with other subscriber units using the same key.

In decision block 32, the central controller 20 determines whether the subscriber unit or radio 10 had acknowledged the key change. If yes, the sequence of operations returns to the original decision block 14 to await new key change requests. If no, a decision block 34 determines whether a predetermined number of allowances to retry the key change has been exhausted. If not, the retry sequence is tried again by returning to step 21 to transmit a key change command with the same operational code. However, if the allowable retries have been exhausted, the central controller 20 places the radio's identification (ID) in a list of radios that need to be rekeyed with the same or previous key command when the radio requests a key change after coming back in-range or being re-activated (assuming the radio is now out-of-range or turned off to be unable to acknowledge). Finally, the central controller 20 returns to the original decision block 14 to await for new key change requests.

Figure 3:
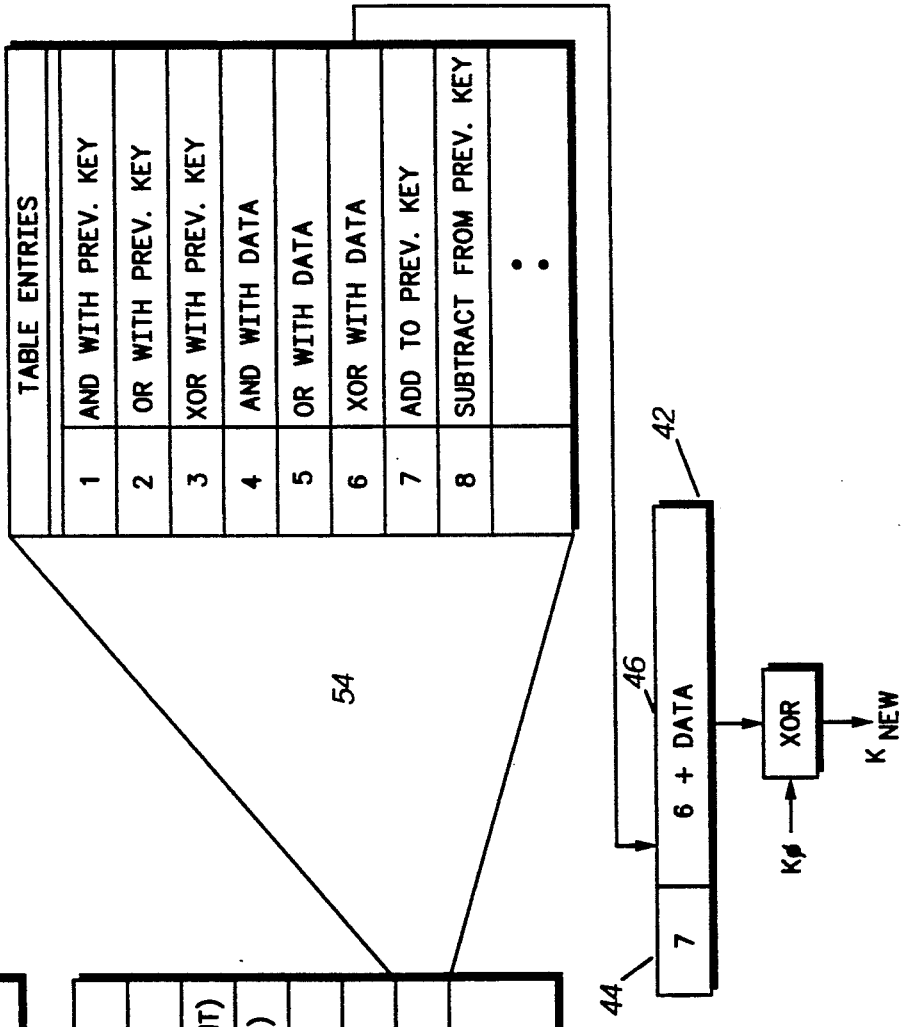
FIG. 3 a schematic diagram depicting a method for generating a varying key in accordance with the present invention.

Referring to FIG. 3, a schematic diagram detailing the generation of the new key $K_{NEW}$ from the information which was transmitted to the subscriber unit 10 by the central controller 20 is shown. The key change command sent by the central controller 20 includes a digital word or key switch OSW 42. The digital word 42 comprises an OP code 44 and some data 46 (which may include a variable number X). This digital word 42 determines the radio's actions to form the new key. As described previously, the method of generating the new key includes the use of functions or operations associated with a particular operational code to be performed on the original key. A list 52 of what the different OP codes could represent is shown in FIG. 3 as an example.

The new key may be simply formed by manipulating the original key through a rotation of the original key sequence through some specific number of positions, X, sent by the controller 20 in the data field 46 of the key change command digital word 42. For simplicity, assume that the following 8 bit key has been originally loaded into the radio or subscriber unit 10 as the original key:

$$K_\phi = 01100111$$

If the decoded OP code 44 is translated to a 1 on the list 52 (which contains the command to rotate right X=3 positions as defined by the OP code 44 and the X=3 in the data field 46), then the following becomes the current or new key:

$$\text{new key} = F(K_\phi) = 11101100.$$

An 8 bit key was chosen for simplicity but an actual key is usually much larger, often containing 64 bits. With 64 bits, it is appreciated that the number of possible keys obtainable through a single series of rotation commands is extremely large to enable changing keys frequently for better security. However, other methods for generating the new key with various operations or functions are also contemplated by the present invention. Certainly other arithmetic or logical operations individually or in combination can be used as well such as rotating left x-number of positions, shifting in data right or left, or ones or twos complimenting. One operation can be continued with another function or with multiple iteration of the same function to generate the new key from a current key.

If more variety or complexity is desired, then an operations table 54 can be used. In this case the data contained in the key change command digital word or key switch OSW 42 is simply an index into a table contained in the subscriber unit's memory which will access the function and/or data to be chosen. Each entry into the table will specify a different operation to be performed on the radio's key. For example, the following operations may be used on the original key: and-ing, or-ing, or exclusive or-ing with the previous key or with data that was previously stored or transmitted in the data field 46 of the OSW digital word; and/or adding to or substracting from the previous key. Any unknowns or variables listed necessary for the decoded OSW OP code functions are supplied by the data field 46 of the OSW digital word 42. On the other hand, the data mentioned in the table entries is contained within the table itself which can be stored in the radio.

For example, the OP code may be a table entry to specify the exclusive or-ring of data with the original key. In this case, a translated OP code representing 7 with an index of 6 may specify a table entry that is already stored in a memory in the subscriber unit 10. On the other hand, the address of the table entry X and data can be transmitted by the central controller 20 in the key change command as data 46.

It is to be appreciated that the actual decoding scheme of the decrypting algorithm is not affected. No major hardware changes are needed and only moderate software changes are required to modify the decrypting key. By varying the keys, this effectively increases the capability of a secure trunking system.

This modification scheme is adaptable to a wide variety of radios. For instance while a higher tier radio having more memory may make use of every Op code function including the table entries, a lower tier radio or radio with tighter memory constraints may wish to utilize only the transmitted operations and not implement any table operations at all. Finally, to increase the variety of possible operations occurring in the field, different subscriber units could have completely unrelated operations tables. Those tables could even be programmable so that they could be changed at regular intervals if desired.

To provide for the case where one or more members of the group whose key was switched was out-of-range or powered off at the time of the key switch, a refresh OSW or digital word will need to be sent. This could simply be the same previous key switch OSW digital word 42 sent out by the central 20 according to some predetermined schedule. To avoid the problem of one subscriber unit missing one key switch or key change command in a series of key switch commands to arrive at the final or new key, all key switch operations may operate on the original key sequence of bits rather than on the last working sequence or previous key. For example, a second command specifying a right rotation of 2 positions would be performed on the original key.

New Key=11011001.

In this manner, the radio will always be rekeyable no matter how long it has been out-of-range or off, as long as the subscriber unit has retained its original base key or original key and the table entries using the previous key as an operator are not used.

In summary, after being loaded with an original key, $K_\phi$, the subscriber unit 10 can generate a new key through a pre-defined series of steps transmitted via one or more key change commands (based on the decoded OP code) that was sent by the central controller 20. Any Boolean algebraic function or other mathematical methods recognized in the art may operate on the original key to form the new key. Because the present invention of remote key manipulation requires much less transmission time in order to perform the key switch or change then the conventional method giving full key information, the present invention can use the existing control channel rather than a new data channel in a trunking system. Hence, this remote key manipulation can be implemented at the central controller with only a moderate amount of central and console software effort.

What is claimed is:

1. A method for remotely changing an original voice encryption key in a secure radio, comprising:
   storing said original voice encryption key in said secure radio;
   transmitting by a central controller to said secure radio a digital word representing only a selective operation selectable from a plurality of different key operations to be performed on said original voice encryption key alone without changing an encryption polynomial; and
   performing only said operation on said original voice encryption key alone in said secure radio to generate a current voice encryption key alone in response to said digital word.

2. The method of claim 1 wherein said transmitting step comprises transmitting a digital word representing a table entry associated with said selective operation to be performed on said original voice encryption key.

3. The method of claim 2 further comprising translating by said secure radio to associate said table entry to said selective operation contained in a table of operations stored in said secure radio.

4. The method of claim 1 wherein said performing step comprises at least one logical operation.

5. The method of claim 1 wherein said performing step comprises shifting right or left said original voice encryption key to generate said current voice encryption key.

6. The method of claim 1 wherein said performing step comprises exclusively or-ing said current with said original voice encryption key to generate a new voice encryption key.

7. The method of claim 1 wherein said performing step comprises or-ing said current with said original voice encryption key to generate a new voice encryption key.

8. The method of claim 1 wherein said performing step comprises and-ing said current with said original voice encryption key to generate a new voice encryption key.

9. The method of claim 1 wherein said performing step comprises adding said current to said original voice encryption key to generate a new voice encryption key.

10. The method of claim 1 wherein said performing step comprises exclusively or-ing said original voice encryption key with a previously stored data word to generate said current voice encryption key.

11. The method of claim 1 wherein said performing step comprises or-ing said original voice encryption key with a previously stored data word to generate said current voice encryption key.

12. The method of claim 1 wherein said performing step comprises and-ing said original voice encryption key with a previously stored data word to generate said current voice encryption key.

13. The method of claim 1 wherein said transmitting step comprises transmitting said digital word including an operation code and data.

14. The method of claim 13 wherein said performing step comprises exclusively or-ing said data with said original voice encryption key to generate a new voice encryption key.

15. The method of claim 13 wherein said performing step comprises rotating right or left said original voice encryption key a number of positions as represented by said data to generate said current voice encryption key.

16. The method of claim 13 wherein said performing step comprises and-ing said data with said original voice encryption key to generate a new voice encryption key.

17. A method of remotely changing an original voice encryption key in a secure radio, comprising:
   storing said original voice encryption key in said secure radio;
   transmitting by a central controller to said secure radio a digital word representing a selective operation to be performed on said original voice encryption key;
   performing said operation on said original voice encryption key in said secure radio to generate a current voice encryption key in response to said digital word, wherein said performing step comprises one's complementing said original voice encryption key to generate said current voice encryption key.

18. A method of remotely changing an original voice encryption key in a secure radio, comprising:
   storing said original voice encryption key in said secure radio;
   transmitting by a central controller to said secure radio a digital word representing a selective operation to be performed on said original voice encryption key;
   performing said operation on said original voice encryption key in said secure radio to generate a current voice encryption key in response to said digital word, wherein said performing step comprises two's complementing said original voice encryption key to generate said current voice encryption key.

19. A method of remotely changing on an original voice encryption key in a secure radio, comprising:
   storing said original voice encryption key in said secure radio;
   transmitting by a central controller to said secure radio a digital word representing a selective operation to be performed on said original voice encryption key;
   performing said operation on said original voice encryption key in said secure radio to generate a current voice encryption key in response to said digital word, wherein said performing step comprises subtracting said original from said current voice encryption key to generate a new voice encryption key.

20. In a trunked communication system including at least one control unit and plurality of secure subscriber units, a method for remotely changing an original voice encryption key in a secure subscriber unit, comprising:
   in said secure subscriber unit:
   storing said original voice encryption key;
   transmitting to said control unit a key change request;
   receiving a key change command from said control unit; and
   performing a selective operation selectable from a plurality of different key operations on said original voice encryption key alone in said secure radio to generate only a current voice encryption key in response to said key change command; and
   in said control unit:
   receiving said key change request; and
   transmitting to said secure subscriber unit said key change command representing only said selective operation to be performed on said original voice encryption key alone without changing an encryption polynomial.

* * * * *

UNITED STATES PATENT AND TRADEMARK OFFICE
CERTIFICATE OF CORRECTION

PATENT NO. : 5,146,498
DATED : September 8, 1992
INVENTOR(S) : Jeffrey Dean Smith It is certified that error appears in the above-identified patent and that said Letters Patent is hereby corrected as shown below:

In Claim 19, Column 8, line 1, after changing delete "on"

Claim 20, column 8, line 17, after and insert --a--

Signed and Sealed this

Fourteenth Day of September, 1993

Attest:

BRUCE LEHMAN

Attesting Officer    Commissioner of Patents and Trademarks